(12) United States Patent
Kramer et al.

(10) Patent No.: US 7,260,640 B1
(45) Date of Patent: Aug. 21, 2007

(54) SYSTEM AND METHOD FOR PROVIDING AN ENHANCED ENTERPRISE STREAMING MEDIA SERVER CAPACITY AND PERFORMANCE

(75) Inventors: James P. Kramer, Coon Rapids, MN (US); James R. McBreen, Shoreview, MN (US); Laura M. Nissen, Andover, MN (US); Thomas P. Sherren, Andover, MN (US); Chen Qingyan, Vadnais Heights, MN (US); Michael R. Burch, Spring Lake Park, MN (US)

(73) Assignee: Unisys Corproation, Blue Bell, PA (US)

( * ) Notice: Subject to any disclaimer, the term of this patent is extended or adjusted under 35 U.S.C. 154(b) by 897 days.

(21) Appl. No.: 10/365,790

(22) Filed: Feb. 13, 2003

(51) Int. Cl.
*G06F 15/16* (2006.01)
*G01R 31/08* (2006.01)

(52) U.S. Cl. .................. 709/231; 709/232; 709/233; 370/229; 370/235

(58) Field of Classification Search ................ 709/231, 709/232, 233; 370/229, 235
See application file for complete search history.

(56) References Cited

U.S. PATENT DOCUMENTS

| | | | | |
|---|---|---|---|---|
| 6,028,843 A * | 2/2000 | Delp et al. | | 370/235 |
| 6,219,704 B1 * | 4/2001 | Kim et al. | | 709/224 |
| 6,353,618 B1 * | 3/2002 | Hung et al. | | 370/459 |
| 6,490,250 B1 * | 12/2002 | Hinchley et al. | | 370/232 |
| 6,542,462 B1 * | 4/2003 | Sohraby et al. | | 370/229 |
| 6,557,067 B1 * | 4/2003 | James et al. | | 710/306 |
| 6,680,906 B1 * | 1/2004 | Nguyen | | 370/229 |
| 6,888,821 B2 * | 5/2005 | Rasanen et al. | | 370/352 |
| 6,888,848 B2 * | 5/2005 | Beshai et al. | | 370/474 |
| 6,978,306 B2 * | 12/2005 | Miller et al. | | 709/226 |
| 7,035,210 B2 * | 4/2006 | Walles | | 370/229 |
| 7,085,848 B2 * | 8/2006 | Cabrera et al. | | 709/232 |

\* cited by examiner

*Primary Examiner*—Aride Etienne
*Assistant Examiner*—Sargon N. Nano
(74) *Attorney, Agent, or Firm*—Beth L. McMahon; Charles A. Johnson; Ricahrd J. Gregson (57) ABSTRACT

Streaming media servers are used to provide data streams of streaming media data to network devices across a communications network. In order to allow the servers to scale its processing as the number of data streams increases, these servers use a delay timer determination module for determining when a given CPU is to transfer its streaming media data corresponding to its group of data streams, a CPU wake up module for initiating an acceleration process for each CPU upon receipt of a signal from the delay timer determination module, and a plurality of CPU processing modules for transferring streaming media data corresponding to its group of data streams. The delay timer determination module uses a stagger and interval parameter where these parameters are calculated from a set of system parameters, including a number of processors available to support data streams, $CPU_{num}$, a size for the smallest data buffer within all of the network devices, $Mem_{ReceiverMin}$, and the maximum bit data transfer rate, $BR_{max}$, supported.

16 Claims, 8 Drawing Sheets

SYSTEM AND METHOD FOR PROVIDING AN ENHANCED ENTERPRISE STREAMING MEDIA SERVER CAPACITY AND PERFORMANCE

TECHNICAL FIELD

This invention relates in general to a method and apparatus to provide streaming media from a server to a plurality of network devices, and more particularly to a method and apparatus for providing an enhanced enterprise streaming server capacity and performance.

BACKGROUND

Streaming media systems are being used to transmit video and audio data over a network to network devices that output the data for receipt by a user. These systems typically transmit data from a central server operated by a provider of the streaming media content data to the end user's network devices. The network used typically is a closed network operated by the provider of the streaming media content data or a service provider who resells the data to end users. Other networks, such as public networks and the Internet may also be used; however these alternate networks may present performance problems associated with providing a latency delay in delivery of the streaming media data within a specified maximum amount of delay.

The ability of the provider of the streaming media content data to increase the number of end users to the system has always presented problems associated with the cost of operating the streaming media servers that send the data to the end users. As the number of users increases, the need for additional servers, the need for additional processors within a server, and the need for additional peripheral devices to support these users' demand for data also increases. The nature of the increase in costs has limited the ability of streaming media providers to grow the size of their networks without incurring prohibitive costs.

Prior solutions utilizing software-only based systems typically were less expensive to create and operate yet these systems did not scale effectively as the number of users increased significantly. Hardware based solutions provided the timing and data transfer mechanisms to allow the number of users to scale more efficiently yet these systems required expensive network interface devices to be part of the streaming server systems. The present invention addresses the limitations of these prior systems to allow for more efficient operation of streaming media servers without the need for special and expensive hardware devices.

SUMMARY

To overcome the limitations in the prior art described above, and to overcome other limitations that will become apparent upon reading and understanding the present specification, the present invention discloses method and apparatus for providing an enhanced enterprise streaming server capacity and performance.

A system in accordance with the principles of the present invention includes a system for providing an enhanced enterprise streaming server capacity and performance. The system has a delay timer determination module for determining when a given CPU is to transfer its streaming media data corresponding to its group of data streams, a CPU wake up module for initiating an acceleration process for each CPU upon receipt of a signal from the delay timer determination module, and a plurality of CPU processing modules for transferring streaming media data corresponding to its group of data streams. The delay timer determination module uses a stagger and interval parameter.

Other embodiments of a system in accordance with the principles of the invention may include alternative or optional additional aspects. One such aspect of the present invention is a method, and corresponding computer data product for providing an enhanced enterprise streaming server capacity and performance. The method provides an enhanced streaming media server and network system using a system that includes a streaming media server, a communications network, and a plurality of network devices. The method determines a stagger delay time period and a interval delay time period using a set of system parameters, initiates a first data transfer for a first group of data streams using a first processor from the streaming media server to a first group of network devices over a communications network, waits a time period corresponding to the stagger delay time period before initiating a next data transfer for a next group of data streams using the next available processing, repeats the waiting a time period corresponding to the stagger delay time period step until all remaining groups of data streams are transferred by their corresponding processor, and waits a time period corresponding to an interval delay time period since the first data transfer occurred and repeating the initiating a first data transfer, waiting a time period, and repeating the waiting a time period steps until all data streams are completed.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

Figure 1:
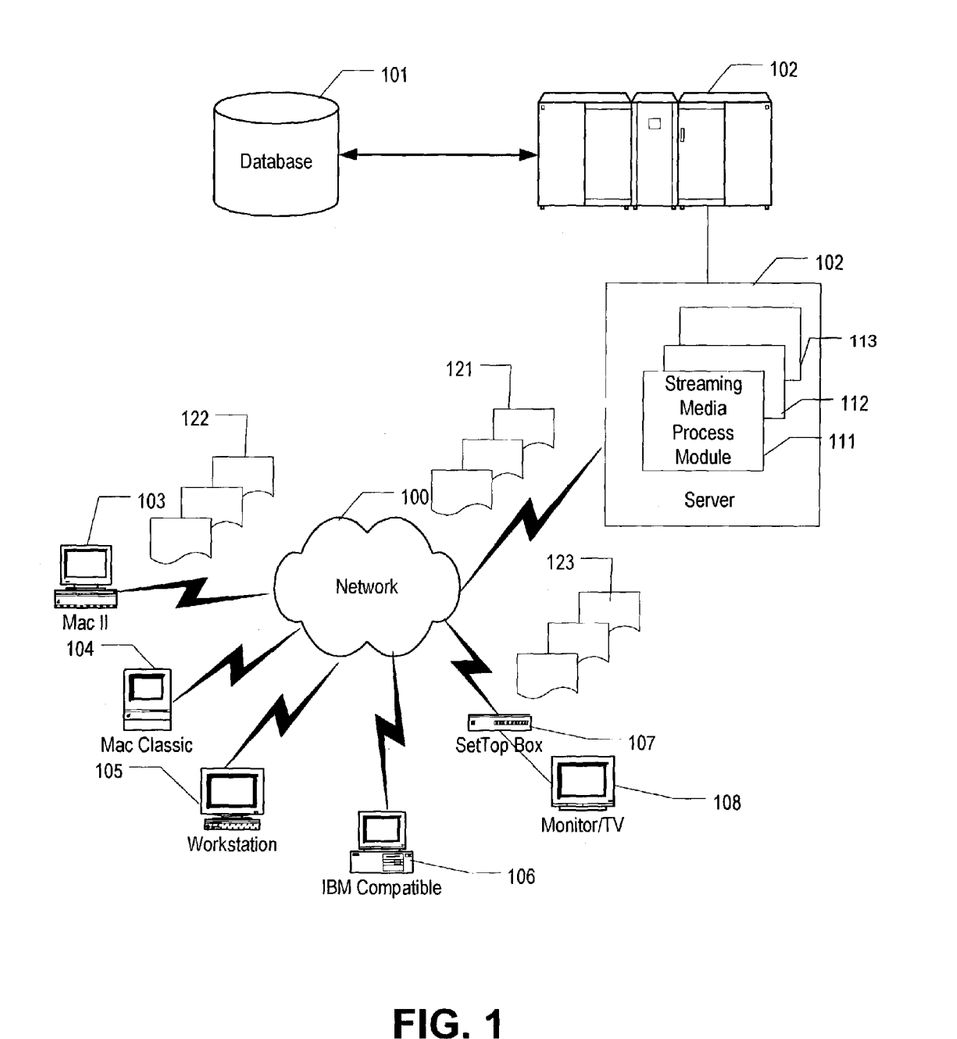
FIG. 1 illustrates a computing system for providing an enhanced streaming media server and network system according to an example embodiment of the present invention.

The present invention provides a method and apparatus for providing an enhanced enterprise streaming server capacity and performance. FIG. 1 illustrates a computing system for providing an enhanced streaming media server and network system according to an example embodiment of the present invention. The streaming media server 102 is connected to a network 100 to transmit streaming media data 121-123 to a plurality of network devices 103-107. The server 102 maintains a database 101 of streaming media content data that is used to store the data transmitted by the server 102 to the network devices 103-107. The server 102 typically has multiple processing modules 111-113 which each transfer data to the network for a subset of the network devices 103-107. As the number of data streams increases, the number of processing modules 111-113 also increases.

The network devices 103-107 may include any number of computing devices that may be connected to the network 100 to receive the streaming media data 121-123. The network devices 103-107 receive the streaming media data and output the audio and video data for viewing by an end user. The network devices 103-107 may include personal computers, workstations, and similar programmable computing systems; however, these devices typically include a set-top box 107 that is connected to a separate monitor or television 108. One skilled in the art will recognize that any of these network devices 103-107 may be used without deviating from the spirit and scope of the present invention as recited within the attached claims.

Figure 2:
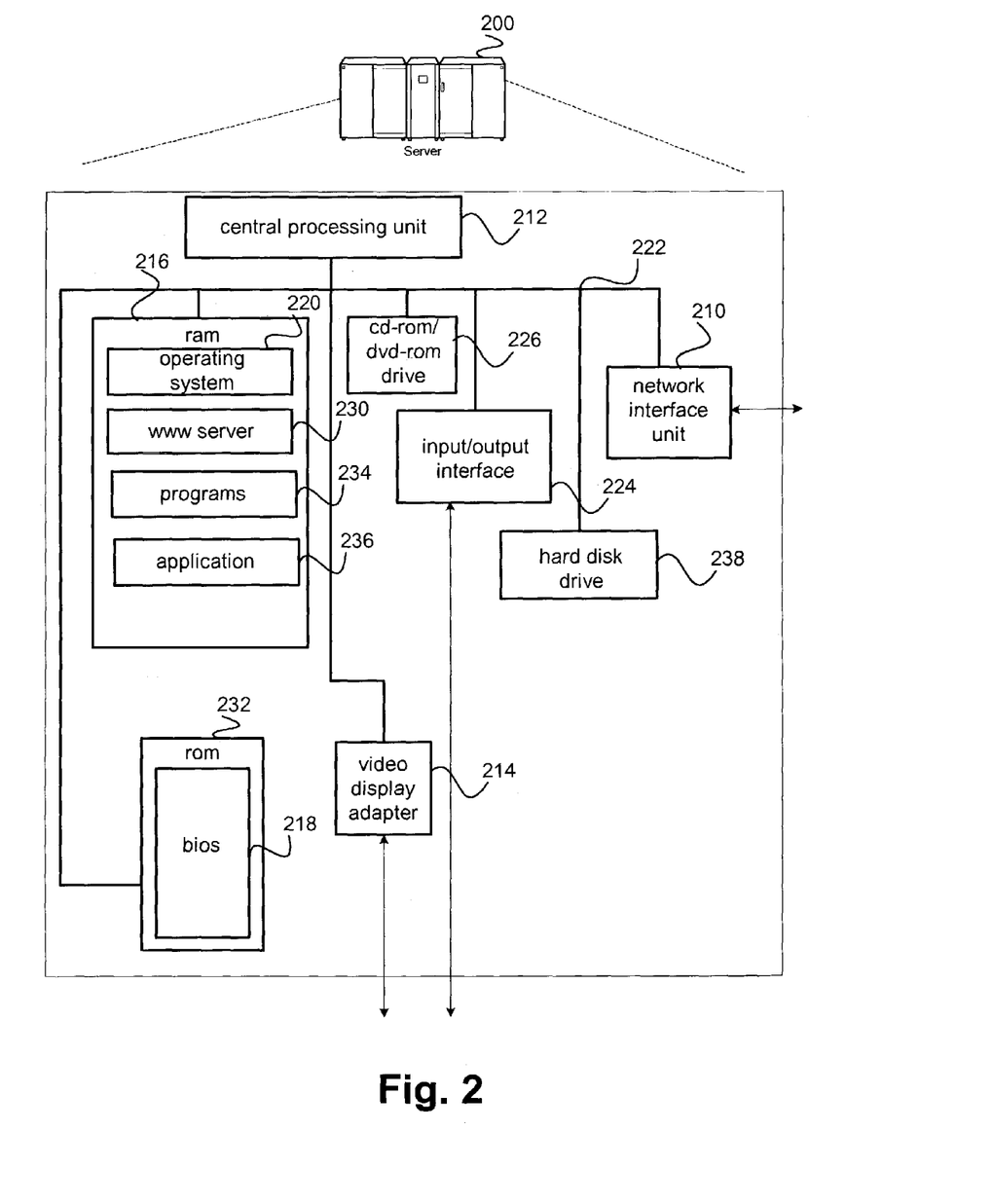
FIG. 2 illustrates a general purpose computing system used to provide an enhanced streaming media server and network system according to another example embodiment of the present invention.

FIG. 2 shows an exemplary server 200 that is operative to provide an enhanced streaming media server and network system. Accordingly, the server 200 transmits streaming media data over a network to a plurality of network devices for output to users.

Those of ordinary skill in the art will appreciate that the server 200 may include many more components than those shown in FIG. 2. However, the components shown are sufficient to disclose an illustrative embodiment for practicing the present invention. As shown in FIG. 2, the server 200 is connected to a communications network, via network interface unit 210. Those of ordinary skill in the art will appreciate that network interface unit 210 includes the necessary circuitry for connecting the server 200 to the network, and is constructed for use with various communication protocols including the TCP/IP protocol. Typically, network interface unit 210 is a card contained within the server 200.

Server 200 also includes processing unit 212, video display adapter 214, and a mass memory, all connected via bus 222. The mass memory generally includes RAM 216, ROM 232, and one or more permanent mass storage devices, such as hard disk drive 238, a tape drive, CD-ROM/DVD-ROM drive 226, and/or a floppy disk drive. The mass memory stores operating system 220 for controlling the operation of the server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of the server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a database processing system. More specifically, the mass memory stores applications including the server application program 230, programs 234, and an intelligent database access searching application 236. Server application program 230 includes computer executable instructions which, when executed by the server computer 200, generate responses to database access queries, including performing the logic described above.

Server 200 also comprises input/output interface 224 for communicating with external devices, such as a mouse, keyboard, scanner, or other input devices not shown in FIG. 2. Likewise, the server 200 may further comprise additional mass storage facilities such as CD-ROM/DVD-ROM drive 226 and hard disk drive 238. Hard disk drive 238 is utilized by server 200 to store, among other things, application programs, databases, and program data used by server application program 230. For example, customer databases, product databases, image databases, and relational databases may be stored. The operation and implementation of these databases, including databases of streaming media content, is well known to those skilled in the art.

Figure 3A:
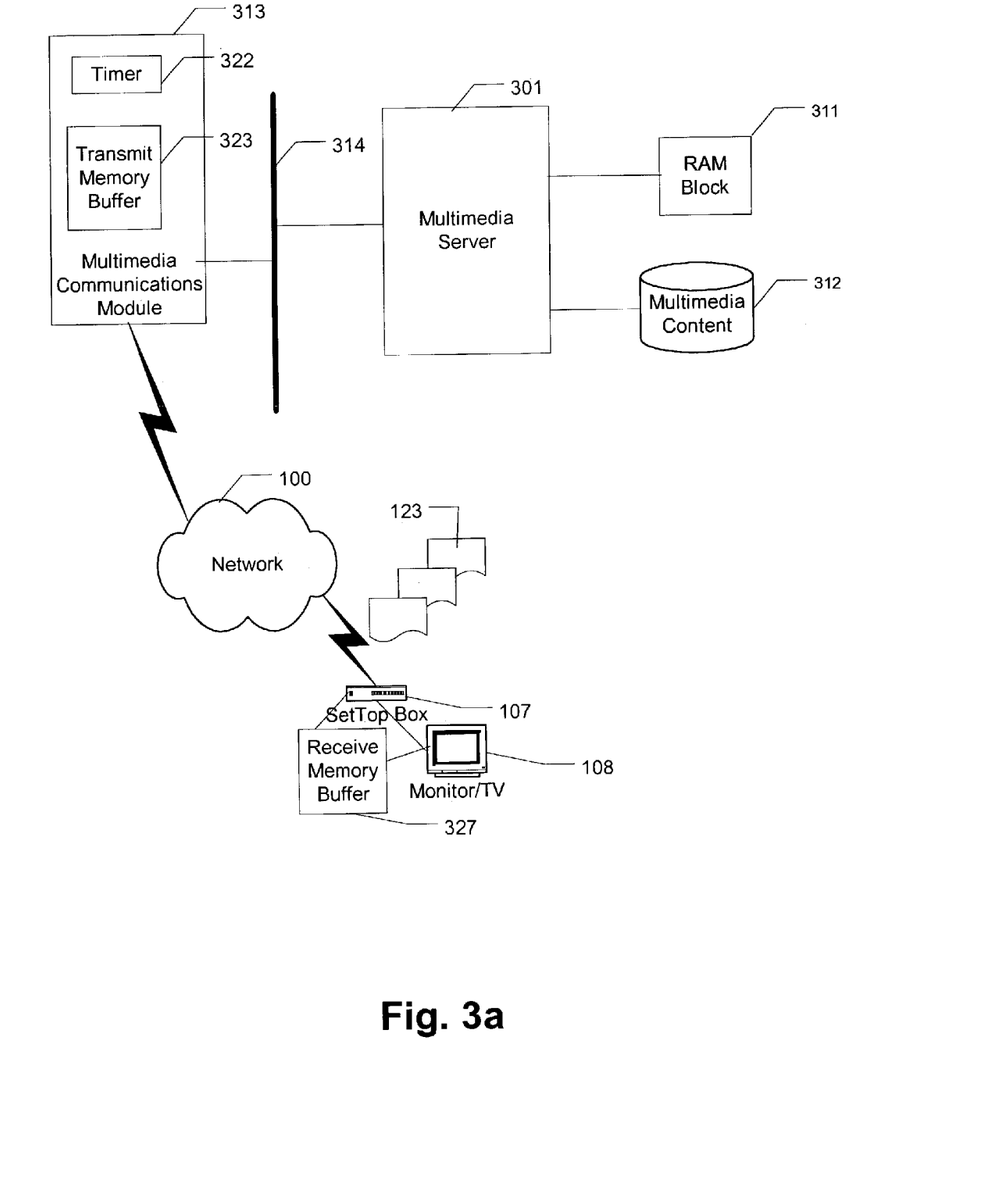
FIGS. 3a and 3b illustrate example embodiments of streaming media servers utilizing alternate data transfer mechanisms.
Figure 3B:
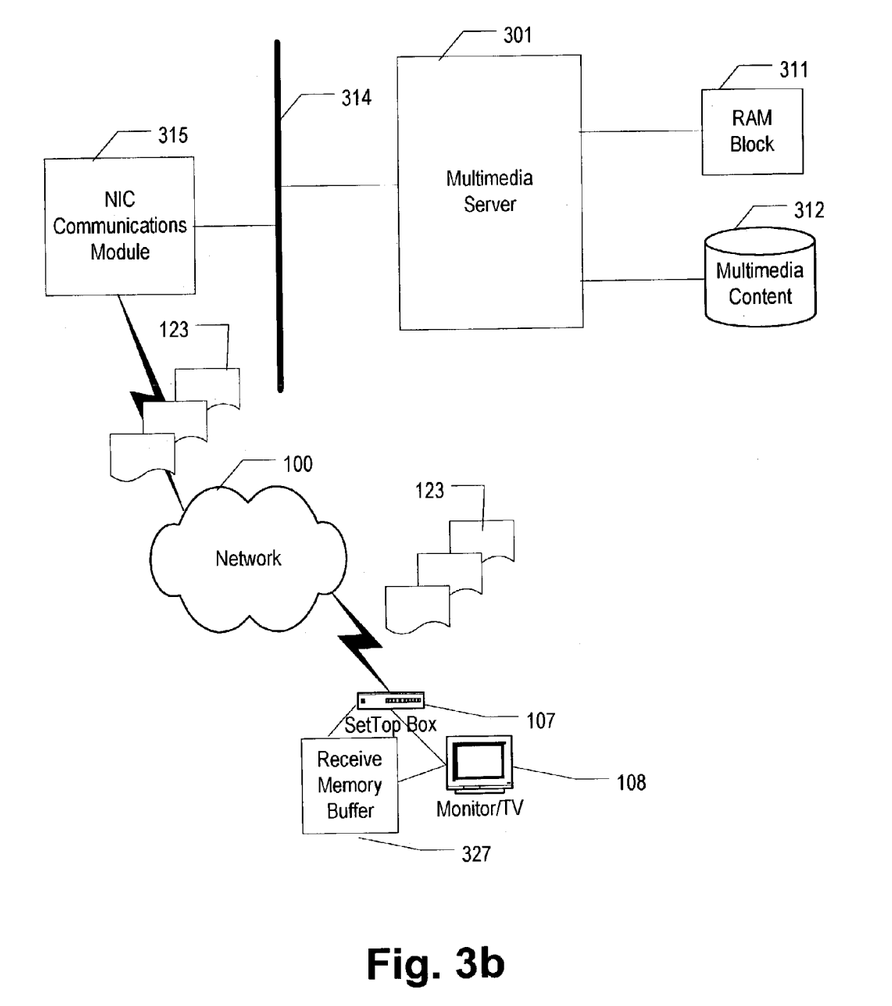

FIGS. 3a and 3b illustrate example embodiments of streaming media servers utilizing alternate data transfer mechanisms. One example of a streaming media server system that utilizes a hardware-based solution to deliver the streaming media data 123 over a network 100 to a network device 107 is illustrated in FIG. 3a. The multimedia server 301 retrieves data from a database 312 for transfer over the network 100 to a network device 107. The multimedia server 301 is connected to the network 100 using a multimedia communications module 313 that is connected to the multimedia server 301 over a system bus 314. The multimedia server 301 possesses a RAM block 311 to store data used by program modules executing within the multimedia server 301 as the streaming media data 123 is transferred from the database 312 to the network 100.

Streaming media data 123 typically consists of audio and video data that is to be output for reception and viewing by a user. The streaming media data 123 may be sent in any numbers of encoded data formats that are well known in the art. Most, if not all of these data formats, require a minimum number of bytes of data to be transmitted to and received by the network device 107 every second in order to permit the video and audio output to a user to as a continuous sequence of video images and/or audio signal. Many of these encoded data formats use a fixed data transfer rate. As such, most telecommunications and cable networks typically provide a data transfer delay that is guaranteed to be no more than a pre-defined maximum delay. Because of this fact, the multimedia server 301 may assume that all streaming media data 123 transferred to the network 100 at a fixed data transfer rate will be received and output to a user at this same data rate.

In order to account for processing and data transfer delays in the multimedia server 301, the network 100, and the network device 107, the network devices 107 typically possess a receive memory buffer 327 to hold the streaming media data 123 as it is received until it is needed by the network device 107. In a hardware-based solution, the multimedia communications module 313 also possesses a transmit memory buffer 323 and data transmit timer module 322 to ensure the streaming media data 123 is transmitted at the desired data transfer rate. The multimedia server 301 retrieves the streaming media data 123 from the database 312 and stores the data into the transmit memory buffer 323 as a large block of data. Once the transmit memory buffer 323 has been filled, the multimedia server 301 may perform other processing tasks while the multimedia communications module 313 transfers the streaming media data 123 to the network 100 at the desired data transfer rate. The data transmit timer module 322 is used to control the timing of data transfers from the transmit memory buffer 323 to the network 100. This elaborate multimedia communications module 313 is needed to account for unpredictable timing delays associated with the multimedia server 301 accessing data in the database 312 in a multiprocessing computing system.

Another example of a streaming media server system that utilizes a software-based solution to deliver the streaming media data 123 over a network 100 to a network device 107 is illustrated in FIG. 3b. In this example embodiment, the multimedia server 301 once again retrieves streaming media data 123 from the database 312 for transfer to the network 100. The multimedia server 301 operates in the manner described above in reference to FIG. 3a except that the multimedia communications module 313 has been replaced with a standard NIC communications module 315. This NIC communications module 315 provides an interface for the server 301 to the network; however it lacks the larger transmit buffer memory 323 and timing module 322 found in the multimedia communications module 313. The multimedia server 301 executes processing modules within its processing modules to place the streaming media data 123 into the NIC communications module 315 at the desired data transfer rate. The operation of this software based multimedia server is better understood with the explanation of its processing and data transfer timing as illustrated in FIGS. 4a and 4b below.

Figure 4A:
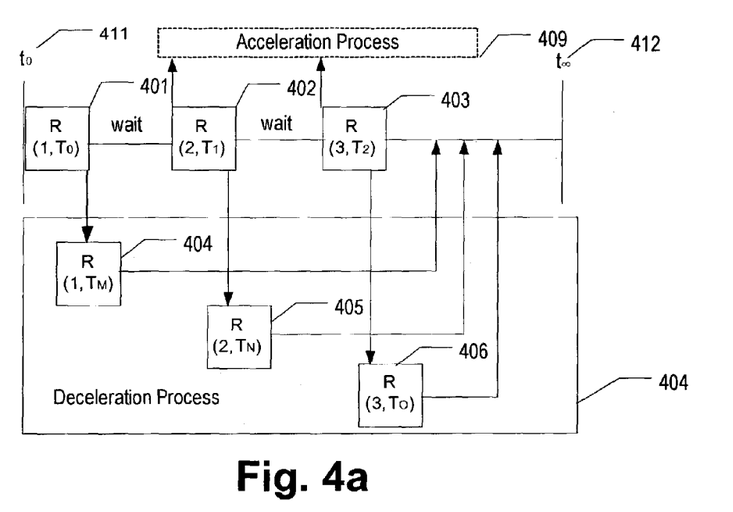
FIGS. 4a and 4b illustrates an example processor utilization and data transfer timing for a streaming media server according to the embodiment of FIG. 3b.
Figure 4B:
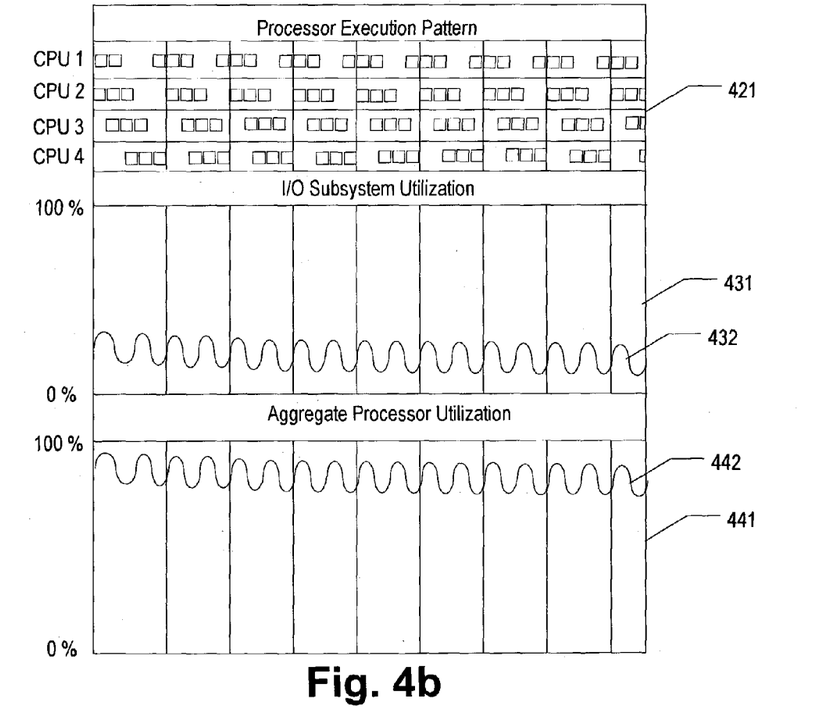

FIGS. 4a and 4b illustrates an example processor utilization and data transfer timing for a streaming media server according to the embodiment of FIG. 3b. In order to handle each of the multimedia data streams 123 to every network device 107, chronological time frames must be maintained for each multimedia data stream 123. FIG. 4b illustrates a timeline 421 containing a plurality of data streams. Each data stream has a specific time that it needs to send data to the network 100. After a process responsible for transferring data associated with a particular stream has transferred an appropriate number of bytes of data, this process must be positioned somewhere further down the timeline that corresponds to a point in time when the next set of streaming media data 123 is to be transferred. In this way, each streaming media data stream 123 may achieve a constant bit rate.

A problem arises after a required number of bytes of streaming media data for any given data stream have been transferred to the network 100. The operation of placing a process associated with transferring data for the data stream back into the timeline is a processor intensive operation. The process involves searching a chronological list of process time events in the timeline and inserting the process into the appropriate place in the timeline. After this processor intensive operation is complete, the multimedia server 301 waits a certain amount of time before it may process the next data stream. This fact occurs because each data stream requires a specific time when it needs to be handled. The process of waiting may be considered a deceleration operation. The deceleration process is defined as the process of placing a given network device's time into a spot further down a chronological time frame and then waiting until this next timer expires to signal a time when more data is to be transferred. In contrast, an acceleration process is defined as the process of awakening any and all processing activities needed to process the data transfer operation at the expiration of a timer.

The processor within the server 301 transitions from an active, or acceleration, state to an inactive, or deceleration, state as data streams are transferred. The transitions of the processor to and from these states are processor intensive operations. Typically, a processor within the server should minimize the frequency of deceleration states so as to maximize system capacity to support multiple streaming media data streams.

After a predetermined time controlled by a timer associated with each data stream, the processor is awakened. As noted above, this operation is known as an acceleration. It is also a processor intensive operation. Once the processor goes from an inactive state to an active state, the processor performs the operations necessary to transfer the next block of data associated with a given data stream. This processing loop of acceleration and deceleration continues while all data streams remain active. The process of continual acceleration and deceleration significantly limits the streaming capacity of a multimedia server 301 as the frequency of deceleration and acceleration operations is proportional to the number of data streams supported by the server. Essentially the server 301 is limited by the aggregate processor utilization 441 even though the I/O subsystem is not operating near its capacity 431.

Figure 5A:
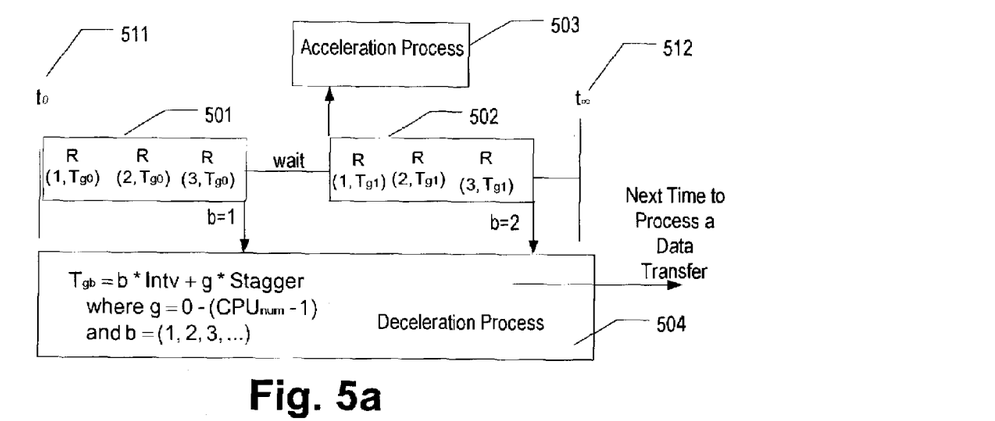
FIGS. 5a and 5b illustrates an example processor utilization and data transfer timing for a streaming media server according to an example embodiment of the present invention.
Figure 5B:
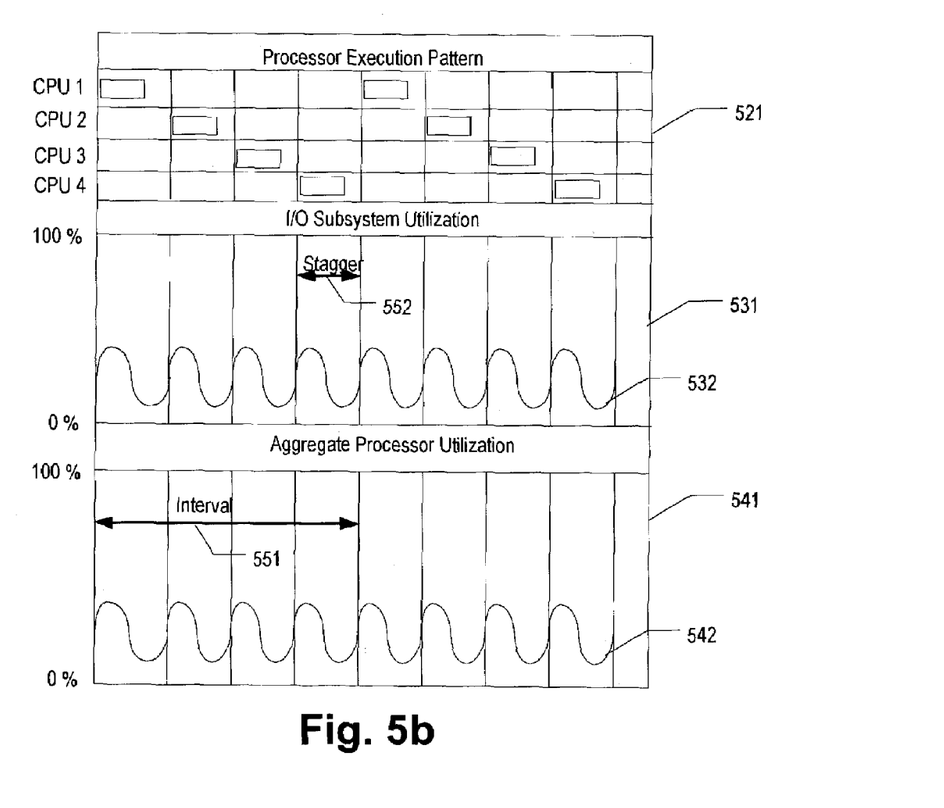

FIGS. 5a and 5b illustrates an example processor utilization and data transfer timing for a streaming media server according an example embodiment of the present invention. A server according to an embodiment of the present invention takes advantage of buffering capacity in the network devices to aggregate software times within the multimedia server 301 across all of the data streams while aggregating I/O operations associated with any given stream. The process significantly reduces the processor utilization 541 of the server 301 by reducing the number of software timers, the number of timer expirations, and the number of I/O operations that must be initiated. All of these improvements in processing are achieved while avoiding I/O overloads that would impact the quality of the reception at the network devices.

FIG. 5a illustrates a data transfer process according to the one embodiment of the present invention. Once again the deceleration process is defined as the process of waiting a time period between data transfers from the server to the network until this next timer expires to signal a time when more data is to be transferred. The acceleration process is once again defined as the process of awakening any and all processing activities needed to process the data transfer operation at the expiration of a timer. The time interval 551 used to define a time period used in the deceleration process is defined as follows:

$$\text{Interval} = \frac{(Mem_{ReceiverMin}/2)}{(BR_{Max}/8)} \quad (1)$$

where BR=Bit Rate in Bits per second  (2)

and Mem=Buffer size of a network device in bytes  (3)

Note that the bit rate value is divided by 8 to convert the time period into bytes and the buffer size is divided by 2 to create a "double buffer" within the network device. Once skilled in the art will recognize that a double buffer permits the network device 107 to use data from one of the two double buffers as output data while the other double buffer is being filled with data received from the network 100.

Because a multimedia server 301 typically possesses multiple CPUs, the timing associated with the data transfer is spread across each of the processors. Since the individual CPUs access the data from the same database over the same I/O infrastructure, a stagger time period 552 is defined as the period when a given CPU is used to process its data streams. The stagger period is defined as follows:

Stagger=Interval/$CPU_{num}$  (4)

where $CPU_{num}$=number of processors  (5)

and BytesToSend=Interval*($BR_{receiver}$/8)  (6)

Using the above equations to define the data transfer timing for its supported data streams, a multimedia server 301 needs to obtain a set of system parameters before any data stream is initiated. First, the multimedia server needs to know the number of CPUs, $CPU_{num}$, that are available for use in supporting data streams. Once this parameter is known, the multimedia server 301 divides the processing associated with the data streams into $CPU_{num}$ groups (g). Using these parameters, the multimedia server 301 may begin processing data streams.

Before the multimedia server 301 processes streaming media data for a given time period, a set of streaming parameters needs to be obtained. The multimedia server 301 needs to know the size of the smallest buffer memory 327 present within any of the network devices 103-107 attached to the network 100. This parameter is known as $Mem_{ReceiverMin}$. The multimedia server 301 also needs to know the highest data stream bit rate that may be supported by the network. This parameter is known as $BR_{max}$. The multimedia server 301 then uses these parameters to calculate the interval between data transmit operations using Eq. 1 above. For each group, an individual processor handles all of the data streams included within the group. The individual processor transfers the number of bytes of data as defined above in Eq. 6 to each network device 103-107 in its group. The processor then determines a time period for its next deceleration as follows:

$T_{gb}$=Interval+g*Stagger  (7)

using the Interval and Stagger terms defined above. The stagger value is used to minimize effects of bursting in processing operations associated with CPU processing and I/O data transfer operations.

Using the above process, the aggregate processor utilization 542 and the I/O subsystem utilization 532 are reduced to comparable levels and thus the processing of additional data streams will scale more predictably and efficiently. As additional data streams are added to the multimedia server 301, the new data streams are placed into the CPU group that is handling the least aggregate data transfer bandwidth since only one processor is allocated to each group of data streams.

The above processing operations permit the system parameters and timing interval to be determined dynamically each time a data transfer occurs. One skilled in the art will recognize that these parameters may not change at a significant rate or frequency. As such, a system in accordance with the present invention may periodically calculate the system parameters that are used in the above equations that are updated at predefined intervals and only upon manual instruction initiated by an operator of the multimedia server without deviating from the spirit and scope of the present invention as recited within the attached claims.

Figure 6:
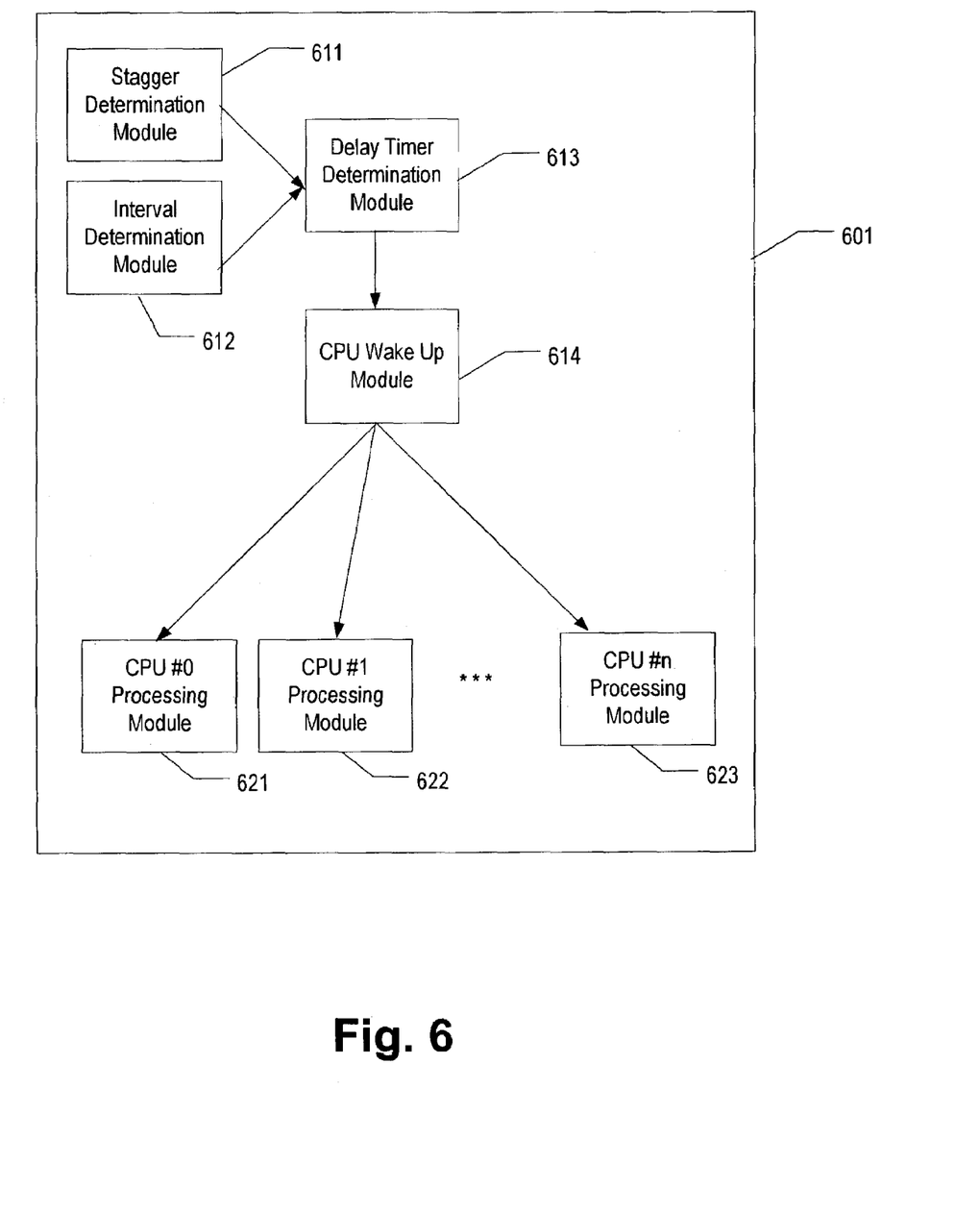
FIG. 6 illustrates a set of processing modules within an enhanced streaming media server in accordance with another example embodiment of the present invention.

FIG. 6 illustrates a set of processing modules within an enhanced streaming media server in accordance with another example embodiment of the present invention. The enhanced streaming media server 600 includes a set of processing modules to implement the data transfer process described above. These processing modules include a stagger determination module 611, an interval determination module 612, a delay timer determination module 613, a CPU wake up module 614, and a plurality of CPU processing modules 621-623. These modules operate together to perform the streaming media data transfer operations discussed above within respect to FIGS. 5a and 5b.

The stagger determination module 611 and the interval determination module 612 obtain the system parameters and calculate the stagger and interval time values as defined above. As noted above, these modules are utilized periodically at a time when the server 601 desires to update these performance parameters. The delay timer determination module 613 uses the stagger and interval system parameters to determine the time period for when a CPU is to be accelerated from a deceleration state to transfer data to the network 100. The CPU wake up module 614 monitors the timeline as it passes to wake up each of the plurality of CPU processing modules 621-623 at the appropriate time to transfer the streaming media data. The plurality of CPU processing modules 621-623 perform the data transfer operations associated with each data stream.

Figure 7:
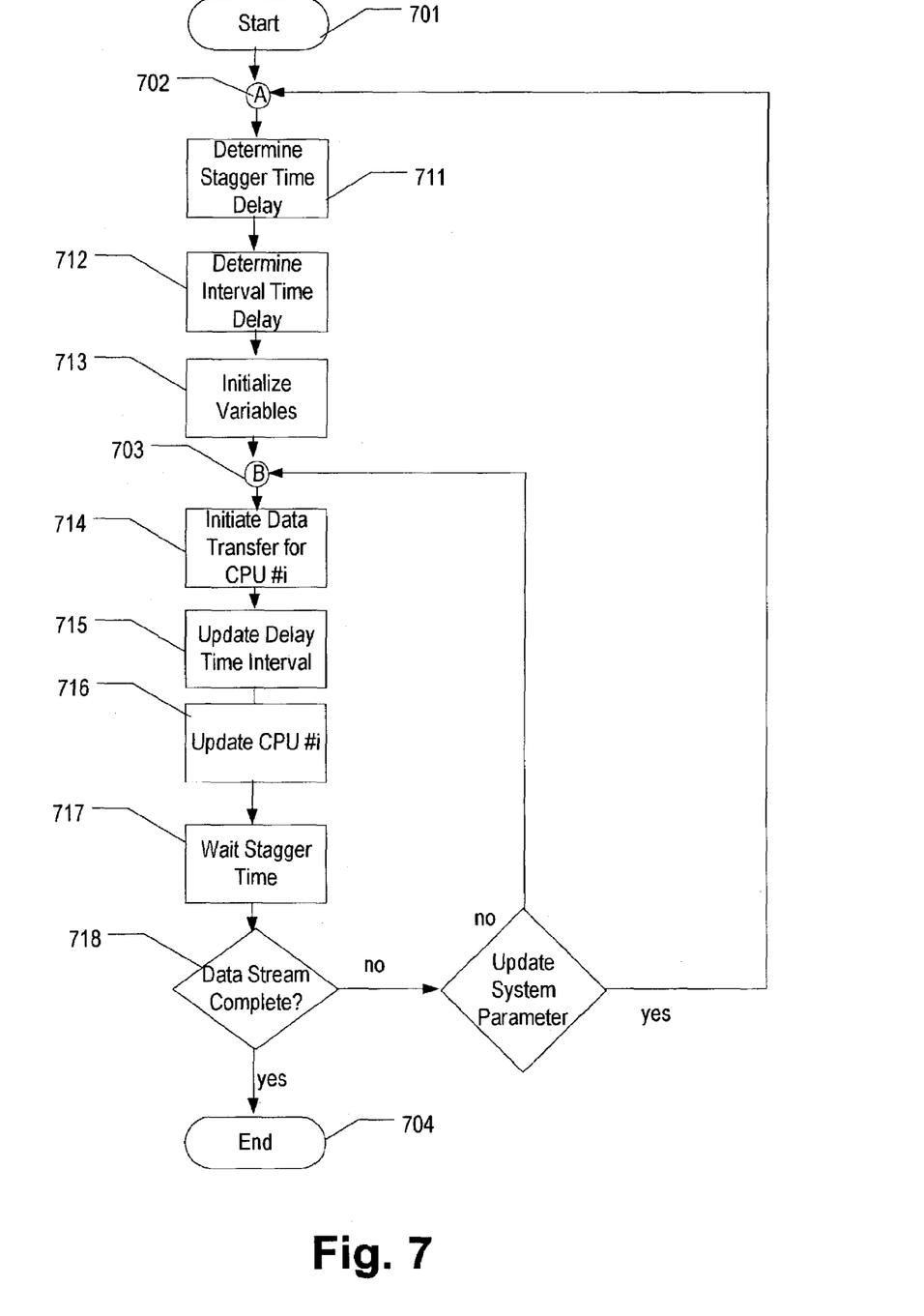
FIG. 7 illustrates an operational flow for a process of processing data within an enhanced streaming media server and network system according to an example embodiment of the present invention.

FIG. 7 illustrates an operational flow for a process of processing data within an enhanced streaming media server and network system according to an example embodiment of the present invention. The processing begins 701 and proceeds to label A 702 that marks the beginning of an overall processing loop. First, a determine stagger time delay module 711 obtains needed system parameters and calculates a stagger time as defined above in Eq. 4. Next, a determine interval time delay module 712 determines the interval time period as defined above in Eq. 1. All other system variables needed for processing within the main processing loop are initialized as needed in module 713.

The main processing loop begins at label B 703 and continues to module 714 where streaming data is transferred for one CPU group, CPU#i when its interval delay is expired. During the first pass through the main processing loop, the interval time is marked as expired. During subsequent passes through the main processing loop, the time corresponding to the interval time since the last data transfer is known.

Module 715 updates the next interval time for the CPU number that was just used to prepare the system to properly transfer the next block of streaming data corresponding to the group of data streams that were just processed. Module 716 updates the next CPU number, CPU#i that is to be processed. The processing waits a stagger time in module 717 until the next group of data streams is to be processed.

Once the stagger time is complete, test module 718 determines if all data streams processed by the multimedia server have ended. If test module 718 determines all of the data streams are complete, the processing ends 704. If test module 718 determines that at least one data stream is still active, the processing continues with test module 719 determining if the system performance parameters, i.e. Stagger and Interval, are to be updated.

When test module 719 determines that the system performance parameters are to be updated, the processing returns to label A 702 to begin another pass through the entire process. When test module 719 determines that the system performance parameters are not to be updated, the processing returns to label B 703 to begin another pass through just the main processing loop. As noted above, the process of passing through these two processing loops continues until all of the data streams have completed.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe a system and method for providing an intelligent database access data search using a plurality of searching mechanisms, one skilled in the art will recognize that the use of the processing system discussed above are merely example embodiments of the present invention. As long as an enhanced streaming media server and network system is present, the present invention would be useable in other data processing systems. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method and a system for providing an enhanced streaming media server and network system. Since many embodiments of the invention can be made without departing from the spirit and scope of the invention, the invention resides in the claims hereinafter appended.

What is claimed is:

1. A method for providing an enhanced streaming media server and network system, the system comprising a streaming media server, a communications network, and a plurality of network devices, the method comprises:

determining a stagger delay time period and an interval delay time period using a set of system parameters;

initiating a first data transfer for a first one of multiple groups of data streams using a first processor from the streaming media server to a first group of network devices over a communications network;

initiating a next data transfer for a next one of the groups of data streams using a next available processor after passage of a time period corresponding to the stagger delay time period;

repeating waiting a time period corresponding to the stagger delay time period step and initiating of a next data transfer for a group that has yet to be transferred until all of the groups of data streams are transferred, each by a different corresponding processor; and waiting a time period corresponding to an interval delay time period since the first data transfer occurred and repeating both of the initiating steps and the repeating step until transfer of all data streams is completed.

2. The method according to claim 1, wherein the set of system parameters comprises a number of processors available to support data streams, $CPU_{num}$, a size for the smallest data buffer within all of the network devices, $Mem_{ReceiverMin}$, and the maximum bit data transfer rate, $BR_{max}$, supported.

3. The method according to claim 2, wherein the interval time delay is defined:

$$Interval = \frac{(Mem_{ReceiverMin}/2)}{(BR_{Max}/8)}.$$

4. The method according to claim 3, wherein the stagger time delay is defined:

$Stagger = Interval/CPU_{num}.$

5. The method according to claim 1, wherein the data streams comprises an audio data stream.

6. The method according to claim 1, wherein the data streams comprises a video data stream.

7. The method according to claim 1, wherein the data streams comprises a combined video and audio data stream.

8. A computer program product stored on a computer readable medium and readable by a computing system and encoding a set of computer instructions for implementing a method for providing an enhanced streaming media server and network system, the system comprising a streaming media server, a communications network, and a plurality of network devices, the method comprises:

determining a stagger delay time period and an interval delay time period using a set of system parameters;

initiating a next data transfer for a first one of multiple groups of data streams using a first processor from the streaming media server to a first group of network devices over a communications network;

initiating a next data transfer for a next one of multiple groups streams using the next available processor after passage of a time period corresponding to the stagger delay time period;

repeating waiting a time corresponding to the stagger delay time period step and initiating a next data transfer for any group of data streams that remains to be transferred until all of the groups of data streams are transferred, each by a different corresponding processor; and waiting a time period corresponding to an interval delay time period since the first data transfer occurred and repeating both of the initiating steps and the repeating step until transfer of all data streams are completed.

9. The computer data product according to claim 8, wherein the set of system parameters comprises a number of processors available to support data streams, $CPU_{num}$, a size for the smallest data buffer within all of the network devices, $Mem_{ReceiverMin}$, and the maximum bit data transfer rate, $BR_{max}$, supported.

10. The computer data product according to claim 9, wherein the interval time delay is defined as $$\text{Interval} = \frac{(Mem_{ReceiverMin}/2)}{(BR_{Max}/8)}.$$

11. The computer data product according to claim 10, wherein the stagger time delay is defined as $\text{Stagger} = \text{Interval}/CPU_{num}$.

12. The computer data product according to claim 8, wherein the data streams comprises an audio data stream.

13. The computer data product according to claim 8, wherein the data streams comprises a video data stream.

14. The computer data product according to claim 8, wherein the data streams comprises a combined video and audio data stream.

15. The computer data product according to claim 11, wherein the computer data product comprises a computer readable storage media.

16. The computer data product according to claim 11, wherein the computer data product comprises a sequence of encoded data superimposed upon a carrier wave transmitted between computing devices.

* * * * *